Oct. 12, 1926.

S. G. WINGQUIST 1,603,179

HYDRAULIC COUPLING AND CHANGE SPEED GEARING DEVICE

Filed Oct. 20, 1920  6 Sheets-Sheet 1

INVENTOR:
Sven Gustaf Wingquist
By Attys
Fraser, Dark & Myers

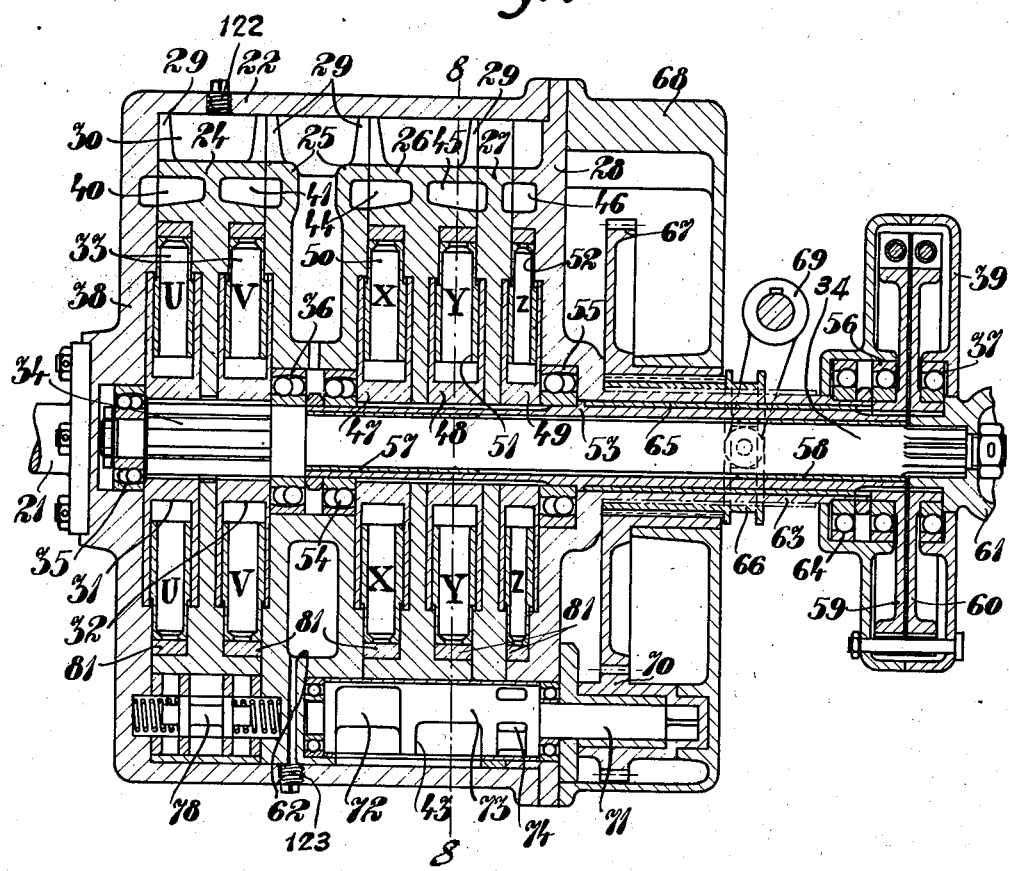

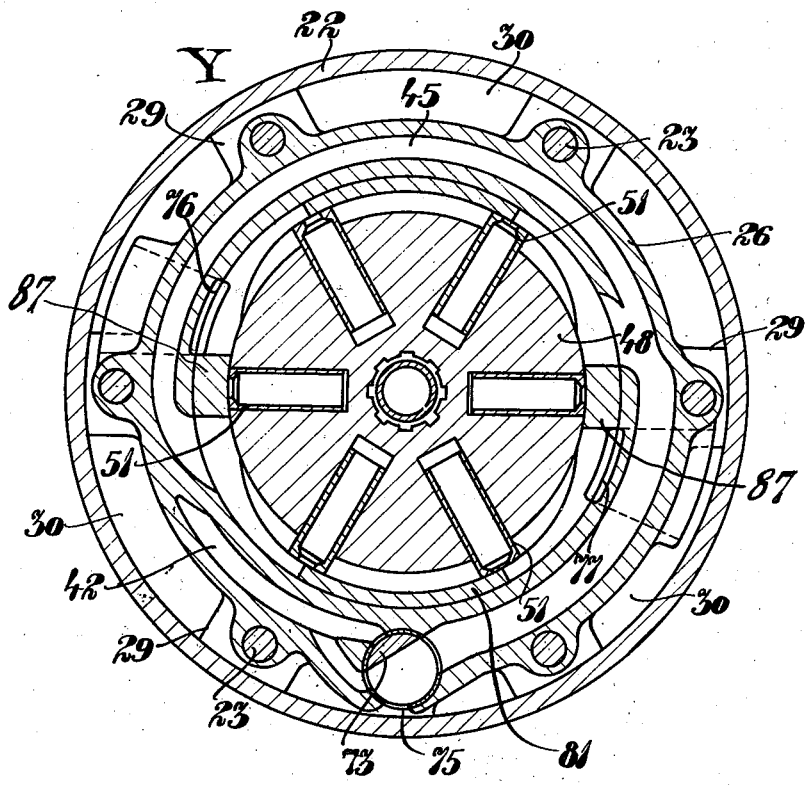

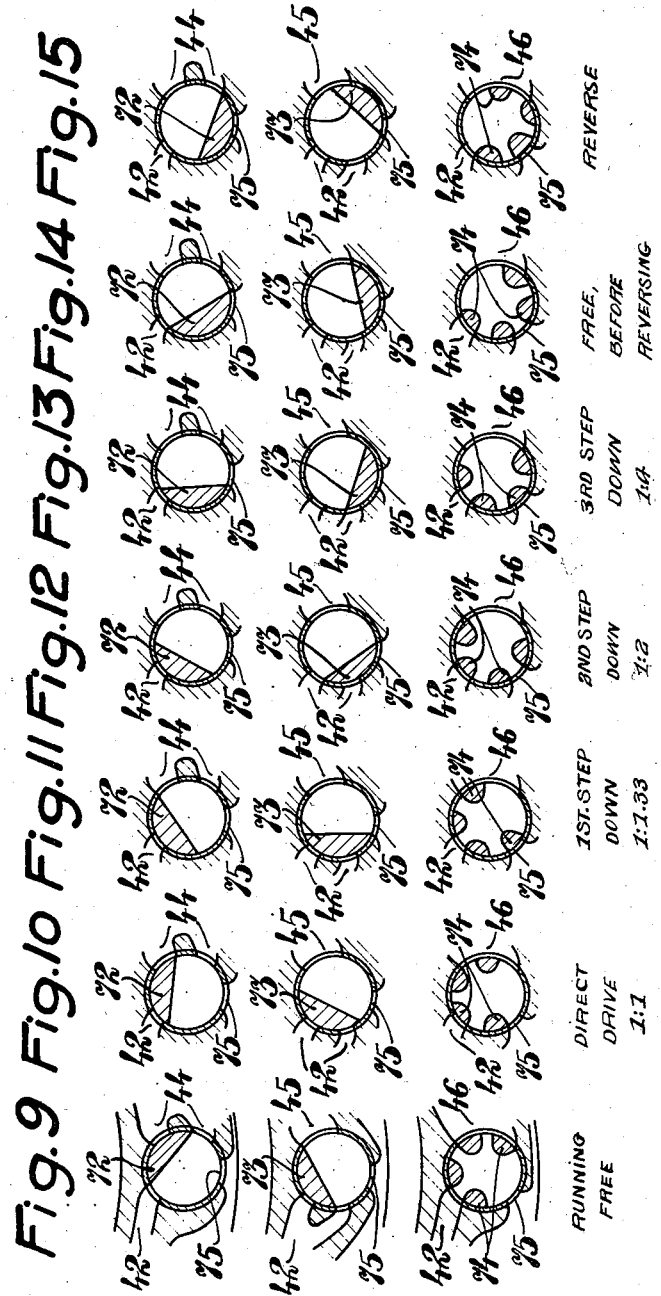

Oct. 12, 1926.
S. G. WINGQUIST
1,603,179
HYDRAULIC COUPLING AND CHANGE SPEED GEARING DEVICE
Filed Oct. 20, 1920 6 Sheets-Sheet 5
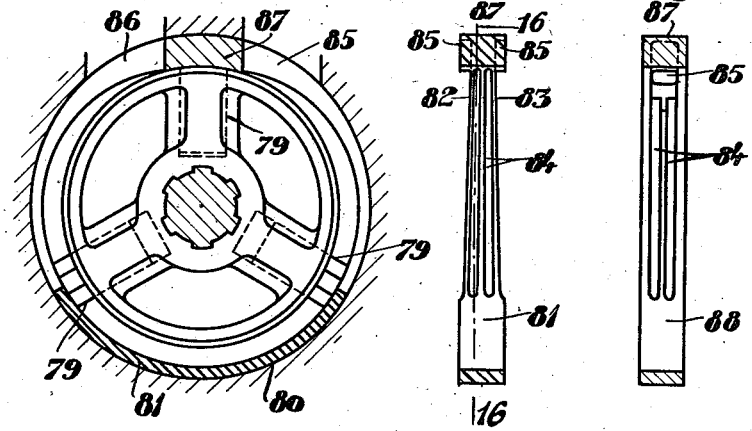
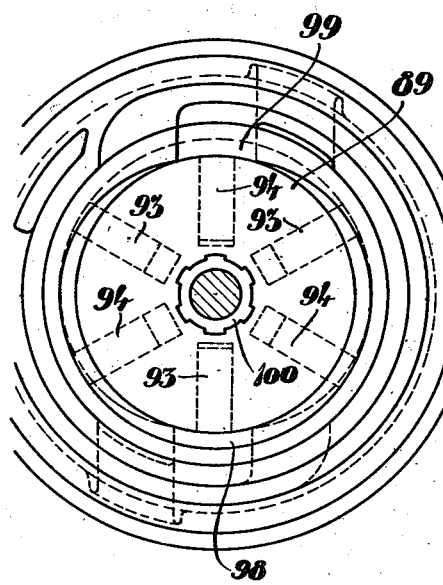
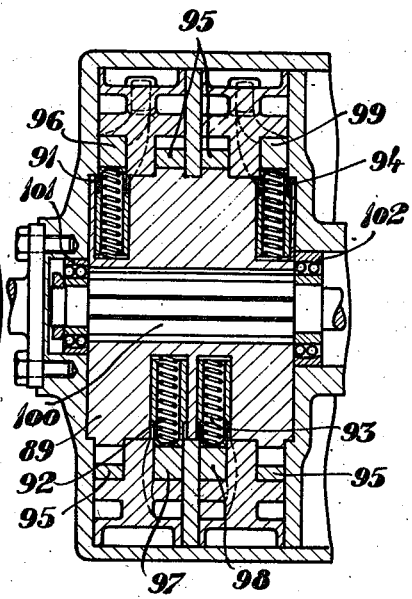

Oct. 12, 1926.
S. G. WINGQUIST
1,603,179
HYDRAULIC COUPLING AND CHANGE SPEED GEARING DEVICE
Filed Oct. 20, 1920    6 Sheets-Sheet 6
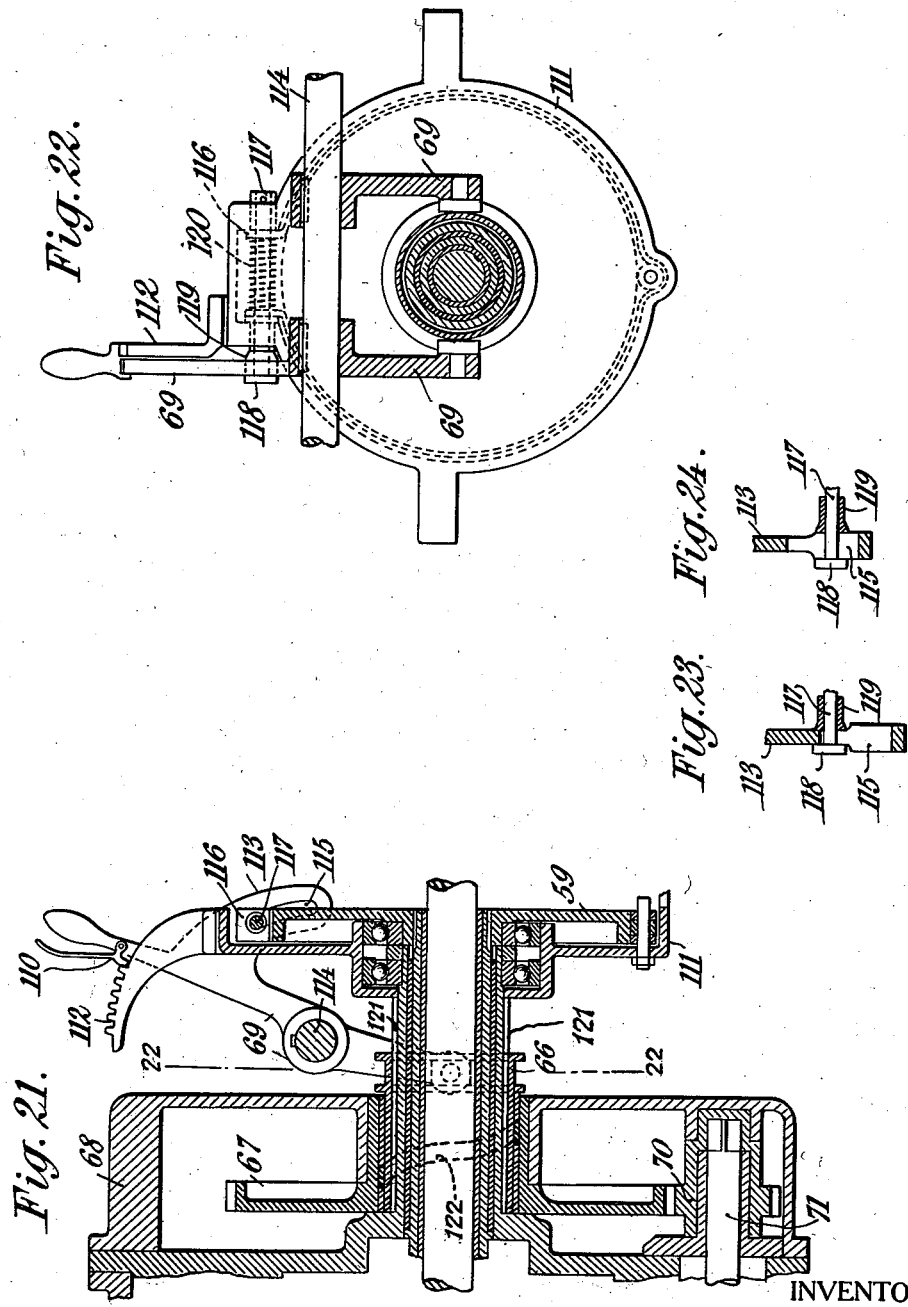
INVENTOR:
Sven Gustaf Wingquist
By Attorneys, Patented Oct. 12, 1926.

1,603,179

UNITED STATES PATENT OFFICE.

SVEN GUSTAF WINGQUIST, OF GOTTENBORG, SWEDEN.

HYDRAULIC COUPLING AND CHANGE-SPEED-GEARING DEVICE.

Application filed October 20, 1920, Serial No. 418,264, and in Sweden July 20, 1920.

This invention relates to hydraulic coupling and change speed gearing devices and is particularly applicable to automobile drives and similar multi-speed transmission mechanisms.

The object of this invention is to provide an improved hydraulic coupling and change speed gearing in which the fluid pumps and motors comprising the drive are of the rotating vane type instead of the reciprocating piston and cylinder type heretofore employed in such devices. A further object of the invention is to provide a means for throwing out of mechanical action pump stages which are not required to produce the necessary fluid transfer for any given speed ratio of the transmission whereby the relative motion of the component parts of such pump stages is avoided. This feature greatly reduces energy losses in the transmission, increases the life of the pump elements, and results in a more smooth operation generally.

The invention further provides a hydraulic coupling and change speed gear which is controlled by a single valve member which in various positions determines the coupling or transmission speed ratios both forward and reverse.

Figure 1:
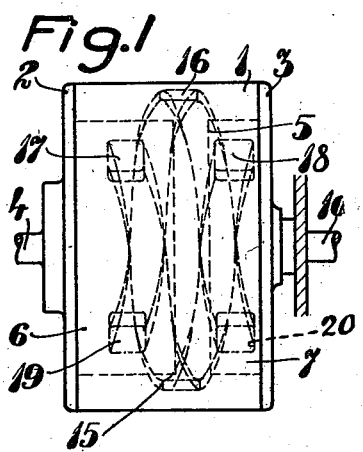
Figure 2:
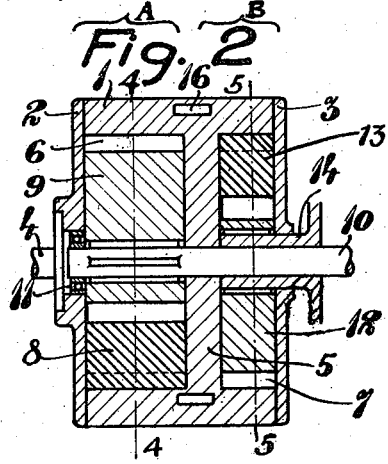
Figure 3:
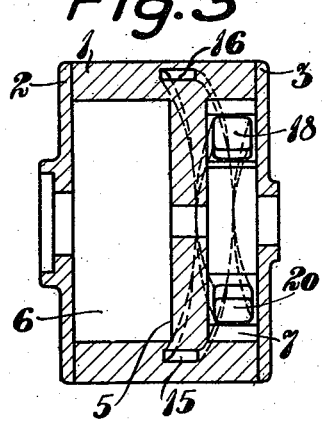
Figure 4:
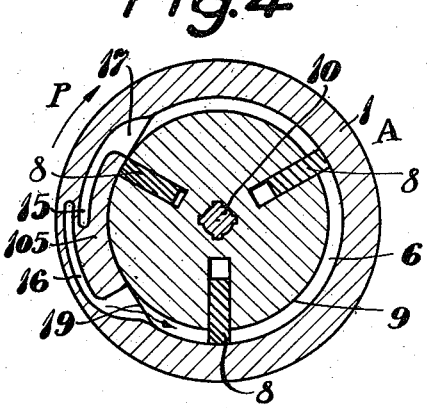
Figure 5:
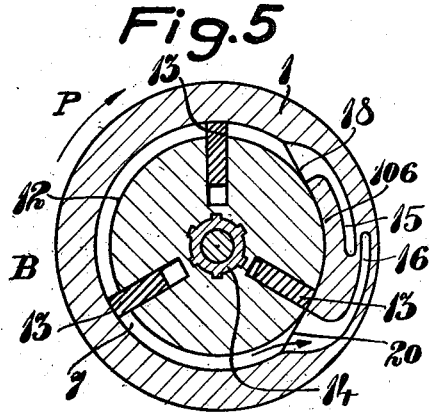
Figure 6:
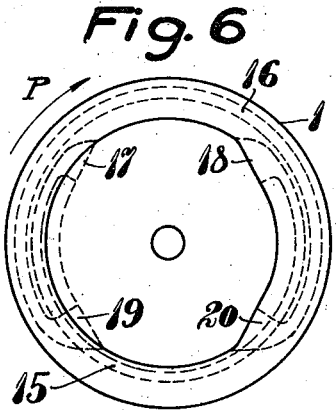

In the accompanying drawings I have shown in Figs. 1 to 6 some explanatory views, and in the remaining figures some embodiments of my invention. Fig. 1 is a side view and Fig. 2 is an axial section of a differential rotating vane pump coupling and change speed gearing device having a single transmission ratio. Fig. 3 is an axial section of the outer housing showing the connecting channels between the delivery and receiving pumps. Fig. 4 is a cross-sectional view on the line 4—4 in Fig. 2. Fig. 5 is a cross-sectional view on the line 5—5 in Fig. 2. Fig. 6 is an end view of the housing showing the channels provided therein. Fig. 7 is an axial section of a coupling and change speed gearing device having several changes of speed and especially adapted for use in automobiles, tractors, and the like. Fig. 8 is a cross-sectional view through pump Y on the line 8—8 in Fig. 7. Figs. 9–15 are detail views of the controlling valve belonging to the embodiment shown in Figs. 7 and 8, illustrating the positions of the valve in free running, direct coupling, first, second, and third step of gear, and reversing respectively. Fig. 16 is an end view of a hydraulic motor or pump of the rotating vane type having one abutment and a specially constructed lining ring forming a part of the stator. (Section of lining ring taken on line 16—16 Fig. 17.) Fig. 17 is a cross-sectional view of said lining ring. Fig. 18 is a cross-section of a modification of the lining ring. Fig. 19 is an end view of a balanced single abutment rotating vane pump system. Fig. 20 is an axial section thereof. Fig. 21 is a section corresponding to the right-hand end of Fig. 7 showing means for controlling the stator elements; Fig. 22 is a transverse section on line 22—22 in Fig. 21; Figs. 23 and 24 are fragmentary detail sections.

Referring to Figs. 1–6 of the drawings, 1 is the outer cylindrical housing of the coupling and change speed gearing device to which are rigidly connected two covers 2 and 3. A shaft 4 adapted to be connected to any suitable motor (not shown in the drawings) is rigidly connected to the cover 2. The housing 1 and the covers 2 and 3 rotate accordingly with the shaft 4 and form together the driving rotor of the device. A wall or partition 5 is provided in the housing dividing the interior of the housing into two rotating vane pump chambers 6 and 7, the volume of the chamber 6 being in the embodiment shown twice that of the chamber 7. The chamber 6 is provided with a rotor 9 hereinafter referred to as the driven rotor which carries radially movable vanes 8 and is keyed on a shaft 10 journalled in a ball bearing 11 in the cover 2 and in the partition 5 and extending through the chamber 7. The shaft 10 is intended to be connected with any machine part to be driven, and will be referred to in the following as the driven shaft. In the chamber 7 a cylindrical body 12 is provided which, like the rotor 9, has three radially movable vanes 13. The body 12 is rigidly connected with a stationary sleeve 14 projecting within the cover 3, and forming a journal for the shaft 10. Accordingly, the body 12 connected with the sleeve is also stationary and forms the immovable part or what will be called hereinafter the stator of the device. In the housing 1 two spiral-shaped channels 15 and 16 are provided which for the normal forward direction of rotation serve respectively as pressure and suction channels. The pressure channel 15 opens at 17 on the discharge or pressure side of the vane pump A and at 18 on the inlet or pressure side of the vane pump B. In similar manner the suction channel 16 opens at 19 on the inlet or suction side of the vane pump A and at 20 on the discharge or suction side of the vane pump B.

The operation of the device shown in Figs. 1–6 is as follows:

If the driving rotor 1, 2, 3 is rotated in the direction indicated by the arrow P, Figs. 4–6, and provided that the rotor 9 offers resistance to this movement, the liquid contained in the device will be forced out at 17 in the pressure channel 15 and be conveyed to the inlet 18 where it flows into the pressure chamber of the receiving pump B. At the same time the liquid is sucked at 20 from the suction chamber of the pump B through the channel 16 to the inlet 19 where it flows into the suction chamber of the delivery pump A. Supposing now first that the capacity of both pumps A and B were equal, i. e. that the pump B can receive the same quantity of liquid which is delivered from the pump A the only result would be a circulation of liquid between the two pumps. But if, as above stated, the volumetric capacity of the pump A is twice that of the pump B when both pumps rotate with the same speed, the pump B can take up only one half of the quantity of liquid which is delivered from the pump A at the same speed. The driven rotor 9 is, therefore, forced to rotate in the same direction as the housing 1 by the fluid reaction against the pump vanes 8, with a speed which is one half the speed of rotation of the driving elements 1, 2, 3 on shaft 4. In this manner a ratio of gear between the shafts 10 and 4 of 1:2 is obtained.

If now it be supposed that in any suitable manner the flow of liquid from the pump A be prevented and that a connection is established to short circuit the pressure and suction sides of the vane pump B, the driving rotor 1, 2, 3 and driven rotor 9, will, as is easily understood, be locked by means of the liquid trapped in the chamber 6 and the shaft 10 will rotate with the same speed as the shaft 4. The device thus acts as a direct coupling and no circulation of liquid takes place in the pump A. The liquid contained in the pump B circulates between the now short circuited pressure and suction chambers thereof through the channels 15 and 16 due to the relative motion of rotor 1, 2, 3 and the stator 12. This circulation of liquid, however, in the now unnecessary pump B represents a certain energy loss which may be avoided according to the present invention by providing a suitable means whereby the stator 12 may be released and permitted to rotate freely with the parts 1, 2, 3 and 9, thereby doing away with all relative movement of the elements of pump B. This is not only a considerable saving in energy but greatly reduces the wear on these parts.

If the drive is reversed and shaft 10 is used as driving shaft and for that purpose connected with any suitable motor and the shaft 4 is the driven shaft the latter will evidently rotate with twice the speed of the shaft 10.

In the device shown in Figs. 1–6 it is supposed that the channels are so arranged that the liquid is conveyed from the delivery pump A through the outlet 17 to the inlet 18 of the receiving pump B acting as motor whereby as mentioned a ratio of gear equal to 1:2 is obtained between the shafts 10 and 4. It is, however, also possible to arrange the channels in such manner (as will be described later) that the liquid is conveyed to the port 17 shown in Fig. 4 acting as inlet from the port 20 shown in Fig. 5 acting as outlet whereby a ratio of gear equal to 3:2 between the shafts 10 and 4 is obtained. In the former case a speed on the driven shaft 10 is obtained which is equal to one half of that of the driving shaft 4; while in the latter case the speed of the driven shaft 10 will be 50% greater than that of the driving shaft. This results in the former case from the arrangement of the channels, whereby the pressure to the liquid in respect of the abutments of pumps A and B (105 and 106 respectively) is directed in opposite directions so that the pressure in the delivery pump and the pressure in the receiving pump are subtracted from each other. In the latter case the pressures in respect to the abutments 105 and 106 respectively will be directed in the same direction and accordingly be added to each other, the pump B in this case delivering oil to the pump A which under these conditions acts as a motor, which as is easily understood results in a gearing up with respect to the speed of rotation of the shafts 4 and 10. The above mentioned changes of speed may for instance be caused by means of a suitable valve device connecting the channels 15 and 16.

If in the device shown in Figs. 1–6 the chambers 6 and 7 are of equal size the device will transmit no power because system A pumps only as much fluid per revolution of the driving rotor about the driven rotor as system B is capable of absorbing in one revolution of the driving rotor about the stator. If on the other hand the chamber 7 is made larger than the chamber 6 the shaft 10 will evidently rotate in a direction opposite to the rotation of the shaft 4. It is furthermore evident that the arrangement of the stator and the rotor may be varied in several manners without departing from the principle of the invention, i. e. the differential action of the liquid. As for instance the rotors as well as the stator may be divided into a plurality of elements independent of each other which by means of suitable valve devices may be controlled separately or simultaneously so that a plurality of different ratios of gear is obtained. Such hydraulic coupling and change speed gearing device adapted for automobiles, tractors and the like is shown in Figs. 7-15 of which as mentioned above Figs. 9-15 show different positions of the controlling valve.

The device shown in Figs. 7 and 8 may now be understood. Here, a cylindrical housing 22 is rigidly connected to a shaft 21 driven from any suitable source of power. To the housing the driving rotor is rigidly connected by means of bolts 23, Fig. 8, said driving rotor consisting of a plurality of annular parts 24, 25, 26, 27, and 28 of which the part 28 also serves as cover for the housing 22. The end cover 38 and the annular members 24 and 25 constitute the housing for the vane pumps U, V and the members 25, 26, 27 and cover 28 comprise the housing for the vane pumps X, Y, and Z which normally act as receiving pumps.

The parts 24—27 abut against the inside of the housing 22 by means of radially disposed projections 29, and with the corresponding part of the cover 28, have a less diameter than the interior of the housing so that between the housing and said rotor parts an annular chamber 30 is formed serving as the suction chamber of the device in which the liquid which is forced outwards by the centrifugal force is rendered free from any admixed air which latter being lighter than the liquid is displaced towards the centre in the manner of the well-known centrifugal separators. It is desirable to free the oil of air as this makes the drive more positive. The construction of the rotor in a plurality of parts offers from the point of manufacture essential advantages as the tightening between parts which are moveable in relation to each other, and the manufacture of the necessary pressure and suction channels, will be facilitated and improved. The driven rotor is in this embodyment made of two identical elements 31 and 32 which, if desired, like the stator (Fig. 8) may operate against two abutments. Each of said elements is provided with six uniformly distributed piston like vanes 33 which are cylindrical and hollow and guided in cylindrical recesses in the rotor body. The rotor parts 31 and 32 are keyed on a shaft 34 which forms the driven shaft and is intended to be connected with the propeller shaft of an automobile or the like. The shaft 34 is journalled in ball bearings 35, 36 and 37 mounted respectively in one side wall 38 of the housing, the rotor part 25 and a brake case 39. In the rotor parts 24 and 25 pressure channels 40 and 41 are provided which by means of a common channel 42, Fig. 8, and a valve device 43 may be connected to pressure channels 44, 45 and 46 provided in the rotor parts 25, 26, 27, and 28 and leading to the pressure chamber of the stator pumps X, Y, and Z. All said channels are, as the channels in the diagrams shown in Figs. 1-6, spiral-shaped so that the liquid always is caused to move in the same direction, thus eliminating friction losses due to sharp turns in the oil conduits. The stator consists here of three elements 47, 48 and 49, each provided with six radially moveable vanes 50, 51 and 52 which for certain structural advantages are made cylindrical and hollow. The vanes of each pump stage thus formed operate against two abutments 87 such as shown in Fig. 8. The stator vane pumps X and Y are equal to each other and furthermore equal to the rotor vane pumps U and V, while the capacity of the stator pump Z in the embodiment shown is equal to one half of the capacity of either of the pumps U or V. The stator elements 47, 48, and 49 are keyed on a sleeve 53 which is journalled in ball bearings 54, 55, and 56 mounted in the rotor part 25, the cover 28 and the brake case 39 respectively. The sleeve 53 is supported by two bushings 57 and 58 in which the shaft 34 may freely rotate. At the outer end of the sleeve 53 is keyed a brake drum 59 on which in well known manner is mounted a brake band 116 (Fig. 22) by means of which the sleeve 53 and the stator parts 47, 48, and 49 may be locked manually or in other suitable manner to a fixed part of the transmission supporting frame. In the case 39 a brake drum 60 is also provided which by means of a coupling element 61 is rigidly connected with the shaft 34 affording an auxiliary friction brake or substitute for the usual rear wheel brake in automobiles. This latter feature is, however, optional and is a mere matter of convenience.

The pistons 33, 50, 51, and 52 bear at their outer ends not directly against the inner surfaces of the rotor parts 24—28 but against lining rings 81 here provided, the construction of said rings being shown in Figs. 16, 17, and 18. In the rotor part 25 a chamber 62 is provided which is in communication with the pressure channels of the change speed gear and which, (similarly to the suction chamber 30), serves as a separating chamber for the liquid on the pressure side and acts as an air receiver to afford a pneumatic cushion for the liquid pumps. Both of the chambers 30 and 62 may be provided with openings 122 and 123 (Fig. 7) which are accessible and may be closed from without and through which the liquid may be filled in or drawn off and the air separated from the liquid may be removed. The housing 22 with the parts mounted therein which at one end is carried by the driving shaft 21 is at the other end by means of a sleeve-like extension 63 of the cover 28 journalled in a ball bearing 64 mounted in the brake case 39, a bushing 65 being provided between the sleeve-like extension 63 and the sleeve 53. On the extension 63 a longitudinally movable but relatively non-rotatable sleeve 66 is slidably mounted, and prevented from rotating by splines 121, said sleeve having on the outside, threads of steep pitch 122 which engage corresponding threads in the hub bore of a toothed wheel 67 rotatably mounted in a bearing shield 68 secured to the cover 28. On axially moving the sleeve 66 (which may be carried out in usual manner by means of a rotatable forked arm 69 engaging the sleeve) the wheel 67 is rotated in the one or other direction dependent on the direction of movement of the sleeve 66. In the shield 68 there is, furthermore, journalled a toothed wheel 70 engaging the wheel 67, the wheel 70 being rigidly connected with the shaft 71 of the valve device 43. The latter consists of three elements 72, 73, and 74 rigidly connected to each other, one for each of the stator pumps X, Y and Z respectively, the construction of said elements being diagrammatically shown in Figs. 9–15 which figures each show a cross-section through the three valve elements in their different positions. In all said figures 42 denotes, as in Fig. 8, the pressure channel common to the delivery pumps U, V. Said channel has for the middle stator pump Y two branches 42 (Figs. 9–15 relating to valve for pump Y). The pressure channels leading to the stator pumps X, Y, and Z are as in Figs. 7 and 8 denoted by numerals 44, 45, and 46 respectively. Of said channels the channel 44 has as is shown two branches. The channel leading to the suction chamber 30, Figs. 7 and 8, is in all figures denoted by 75. Each stator pump X, Y, and Z, in the embodiment shown, has two abutments 87, Fig. 8, and has necessarily two suction channels as shown at 76 and 77, Fig. 8, communicating with the suction chamber 30. In a similar manner the rotor pumps U, V, which as mentioned also may have two abutments, are each provided with two channels communicating with the suction chamber, which are in every way similar to the channels 76 and 77 of pump Y shown in Fig. 8.

Supposing that the valve device 43 has been adjusted in such manner that the valve elements controlling pumps X, Y, and Z 72, 73, and 74 respectively have the positions shown in Fig. 9 in which all pump elements are short-circuited, i. e. have direct communication between their pressure and suction chambers. The result will evidently be that if the driving shaft 21 with the housing 22 and the rotor parts 24—28 are rotated, all elements will rotate freely without setting up any appreciable pressure in the liquid. Said position of the valve elements represents accordingly free running.

If the valve device 43 now is moved one step to the position shown in Fig. 10, the communication between the pumps U, V and the pumps X, Y, and Z is completely interrupted. The driving rotor elements 24, 25 will accordingly be coupled with the driven rotor elements 31, 32 directly by means of the liquid enclosed in said elements while the pumps X, Y, and Z will be short-circuited i. e. will have direct communication between their suction chambers and the pressure chambers, the liquid circulating in each element through the channels 44, 45, and 46 respectively and the channels 75, 76 and 77. The power is accordingly transmitted from the shaft 21 by the aid of the housing directly by means of the liquid pressure through the locked pumps U, V to the shaft 34 without pumping action. For avoiding the frictional losses caused by the pumping action of stator pumps X, Y, and Z the stator vane carrying elements 47, 48 and 49 may be released by releasing the brake wheel 59 so that the sleeve 53 connected to the stator elements can rotate freely. In this valve position, which represents direct coupling, the shaft 34 rotates with the same speed as the shaft 21 and the whole power is directly transmitted by means of the liquid pressure without pumping action. The releasing of the stator elements should preferably also be effected in free running to reduce the wear on these parts.

On rotating the valve device a further step to the position shown in Fig. 11, the communication between the pumps U, V and X, Y is still interrupted while communication is opened between the delivery pumps U, V and the receiving pump Z. The pumps X, Y are each short-circuited in this case while the liquid delivered from the pumps U, V is conveyed through the channel 42, the valve device 43 and the channel 46 to the pressure chamber of the receiving pump element 49 and after having passed through said element to the suction channels 76, 77 and then through the common suction chamber 30 back to the suction chambers of the pumps U, V. As mentioned the receiving pump Z has, in the embodiment shown, a capacity which is only one fourth of the total capacity of the delivery pumps U and V. The pump Z can accordingly take up only one fourth of the quantity of liquid which could be delivered by such pumps, the result being that the driven rotor will be rotated by the driving rotor and the shaft 21 with a 25% lag on account of the chosen relative volumes, because the difference in speed between the driving and driven rotors is determined by the transfer of oil from the delivery pumps to the receiving pump. The ratio of gear between the shafts 34 and 21 will be 3:4. The valve position shown in Fig. 11 represents the first reduction of gear.

In Fig. 12 the valve device has been rotated a further step so that communication has been established between the pumps U, V and the pump Y while the communication is interrupted between the pumps U, V and the receiving pumps X and Z which each are short-circuited. As the capacity of the pump element Y is half of that of the combined delivery pumps U, V it is evident that the ratio of gear between the shafts 34 and 21 now is 1:2. The valve position shown in Fig. 12 represents the second reduction of gear.

According to Fig. 13 communication has been established between the pumps U, V and the pumps Y, Z while the pump X is still short-circuited. On account of the ratio of volumes between the now active pump systems the ratio of gear between the shafts 34 and 21 will now be as 1 to 4. The valve position according to Fig. 13 represents the third reduction of gear.

From the description of Figs. 11–13 is evident that only such part of the power which corresponds to the difference of speed between the shafts is transmitted by means of pumping action, while the other and usually the greatest part of the power is transmitted directly by the liquid pressure between the driving and driven rotors without pumping action.

When the valve is turned to the position shown in Figure 14, the driving member will run freely while the driven member is stationary, for the reason that the receiving capacity of the now active pumps X, Y exactly equals the delivery capacity of pumps U, V and consequently no driving pressure is developed in the transmission liquid. This position is preparatory to the reverse. If the capacity of the stator pumps U, V is made greater than that of the driven rotor pumps, which in the present case may be realized by connecting in all receiving pumps X, Y and Z, the latter will now have a greater combined pumping capacity and will evidently act as delivery pumps and deliver liquid to the normal delivery pumps U and V which on this account will be driven in a direction opposite to the direction of rotation of the shaft 21, the rotation of the shaft 34 being accordingly reversed. The corresponding valve position is shown in Fig. 15. The greater the capacity of the stator elements in relation to that of the rotor elements the more rapidly will the shaft 34 be driven in the reverse direction. In this case all pressure channels and pressure chambers will be changed into suction channels and suction chambers respectively, and vice versa. For avoiding damage on account of too high pressures caused by sudden changes of speed, a safety valve 78, is arranged between the suction and pressure chambers, said valve causing automatically communication between the pressure and suction chambers until excess pressure is relieved.

For actuating the valve device as described with reference to Figs. 7–15, by means of the toothed gears 67, 70, the axially movable screw-threaded sleeve 66 and the lever 69, and for clamping fast the stator, the mechanism shown in Figs. 21–24 may be used. The several setting positions are fixed by means of a catch 110 secured to the arm 69 and engaging with a rigid toothed bow 112 secured to the braking frame. The lever 69 is provided with an extension 113, having an opening 115 concentric with the center of the shaft 114 and engaged by pin 117 which passes through the braking band 116 and is secured in the braking frame 111, said pin having a head 118 resting against the extension 113. Between said extension 113 and the free end of the braking band 116 an axially movable sleeve 119 is provided on the pin 117 whereas between the ends of the braking band a spiral spring 120 is provided on the pin, said spring tending to move the braking band out of engagement with the braking wheel 59 and thus release the stator elements. The free end of the extension 113 is, as shown in Figs. 23 and 24, somewhat thicker than the other part thereof, so that when the lever 69 with the extension 113 is swung in relation to the pin 117 in the position shown in Fig. 24, the sleeve 119 will press the ends of the braking band 116 toward each other against the action of the spring 120 and thus lock the braking wheel 59 and the stator elements. The position of the lever 69 and its extension 113 shown in Fig. 23 corresponds to the valve position shown in Fig. 9, i. e. free engine, the braking wheel 59 and the stator elements being in such case released. If the lever 69 is turned one step to the left in Fig. 21, corresponding to the valve position shown in Fig. 10, i. e. direct coupling, the pin head 118 and the sleeve 119 are still engaged by the thinner part of the extension 113 and the stator elements are accordingly still released. By throwing the lever 59 a further step in the same direction the pin head 118 and the sleeve 119 will be engaged by the thicker part of the extension 113 (Fig. 24) and the braking band 116 will be tightened against the wheel 59 so that the stator elements are locked.

An advantageous feature of a coupling and change speed gearing device according to the present invention is that the rotary housing 22 with the shaft 21 and the rotor parts 24—28 serve as a fly wheel and thus are a substitute for the fly wheel which must be provided for instance in automobiles; the said parts and the driven rotor 31, 32 and the stator 47—48 being at the same time a substitute for the usual change speed gear. Furthermore, the starting of an automobile provided with the present hydraulic change speed gear as well as the changes of the speed take place more gradually than in automobiles having change speed devices with toothed wheels.

In Fig. 16 I have shown a hydraulic vane pump of well-known construction with one abutment 87 in which, as in the device shown in Figs. 7 and 8, the outer cylindrical ends of the vanes 79 are guided by the special lining ring 81 inserted in the housing 80. Said ring is, as is shown in Fig. 17, at the sides provided with recesses 82 and 83 which in an embodiment with three vanes as shown should preferably be extended each over a third of the periphery. Said recesses form together with the housing 80 channels for the supply of the liquid to the vane pump and its discharge therefrom. Said special lining rings which easily may be standardized offer from the point of manufacture essential advantages in comparison with the usual construction in which the guiding surfaces as well as the channels must be formed in the housing itself which makes it difficult to obtain the necessary exactness. The lining ring 81 is, furthermore, in or near its middle provided with two peripherically extending grooves 84 which serve as inlet and outlet channels for the liquids in the hollow cylindrical vanes 33 or 51, 52, 53 (Fig. 7) into which the liquid has access. Furthermore, the lining ring has two pairs of radial or substantially radial ports 85 and 86 arranged one on either side of the abutment 87, said ports forming connecting channels to the pressure and suction chambers respectively of the vane pump.

In Fig. 18 I have shown a modification of the lining ring 88 which differs from the lining ring 81 shown in Figs. 16 and 17 chiefly in that the side recesses (82, 83) are omitted and that the recesses 85 and 86 forming the connecting channels are made in the body of the rings and not in their sides as shown in Fig. 17.

In a single abutment hydraulic vane pump of the kind shown in Fig. 16 the liquid pressure will, of course, act one-sidedly causing an unbalanced load on the shaft and the bearings. Said drawback may be avoided by dividing the machine into four elements, each having its own vane system and being so arranged that the similarly disposed abutments of the two outer elements are diametrically disposed in relation to the abutments of the two inner elements. An embodiment of such a coupling and change speed gearing device according to the present invention is shown in Figs. 19 and 20.

The device shown in Figs. 19 and 20 corresponds to the rotor or delivery pumps U, V of the device shown in Fig. 7 while the stator or receiving pumps for the sake of simplicity have been omitted. The rotor body which, of course, may be made in several parts, if desired, is provided with four piston vane systems 91, 92, 93, and 94 of which the two outer vane systems 91 and 94 are similarly positioned and displaced 180° in relation to the inner vane systems 92 and 93. All pistons are at their outer ends guided by lining rings 95 which preferably are constructed as shown in Figs. 16 and 17 and have their abutments 96, 97, 98 and 99 arranged in accordance with the piston systems, the driven shaft 100 and the bearings 101 and 102 being in this manner completely relieved from the pressure exerted by the liquid. It is evident that also the stator elements in the device shown in Figs. 7 and 8 may be balanced in a similar manner, if desired.

While certain specific embodiments of the invention have been described and illustrated in the foregoing, the invention is not limited thereto as numerous modifications and changes will suggest themselves to those skilled in the art which do not depart from the spirit of the invention as set forth in the following claims.

What I claim is:—

1. A hydraulic coupling and change speed gear comprising a rotary driving member, a rotary driven member, a rotatable member, means normally holding said rotatable member stationary and a fluid pump operably connected between said rotary members normally acting as a delivery pump, and a second fluid pump operably connected between a rotary member and said rotatable member and normally acting as a receiving pump, conduits connecting said pumps and means for releasing the rotatable member for free rotation.

2. A hydraulic coupling and change speed gear comprising a rotary driving member, a rotary driven member, a rotatable member, means normally holding said rotatable member stationary and a fluid pump operably connected between said rotary members normally acting as a delivery pump, and a second fluid pump operably connected between a rotary member and said rotatable member, and normally acting as a receiving pump, conduits connecting said pumps, valve means for cutting off the flow of fluids between said pumps, and means for releasing the rotatable member for free rotation.

3. A hydraulic coupling and change speed gear comprising a rotary driving member, a rotary driven member, a rotatable member, means normally holding said rotatable member stationary, a set of fluid pumps operably connected between said rotary members normally acting as delivery pumps, and a set of fluid pumps operably connected between a rotary member and said rotatable member normally acting as receiving pumps, fluid conduits connecting said pumps, and valve means for cutting out of the active pumping system one or more pumps of a set to vary the relative pumping capacity of the two connected sets and means for releasing the rotatable member for free rotation.

4. A hydraulic coupling and change speed gear comprising a rotary driving member, a rotary driven member, a rotatable member, means normally holding said rotatable member stationary, a set of fluid pumps operably connected between said rotary members normally acting as delivery pumps, and a set of fluid pumps operably connected between a rotary member and said rotatable member normally acting as receiving pumps, fluid conduits connecting said pumps, valve means for cutting out of the active pumping system one or more pumps of a set to vary the relative pumping capacity of the two connected sets, valve means providing a short circuit between the pressure and suction chambers of pumps which are cut out of the active pumping system by the first mentioned valve means, and means for releasing the rotatable member for free rotation.

5. A hydraulic coupling and change speed gear, comprising a driving rotor, a driven rotor, and a stator, one of the rotors and the stator having vanes, the driving rotor and the driven rotor forming together a vane pump device and one of the said rotors and the stator forming together a second vane pump device, conduits connecting said pumps and means for releasing the stator whereby it may be rotated with its co-acting rotor to avoid any relative motion between the parts of the pump when no pumping action is required.

6. A hydraulic coupling and change speed gear, comprising a driving rotor, a driven rotor, and a stator, one of the rotors and the stator having vanes, the driving rotor and the driven rotor forming together a vane pump device and one of the said rotors and the stator forming together a second vane pump device, one of said rotors consisting of annular elements having lining rings serving as guides for the outer ends of the vanes and conduits connecting said pumps.

7. A hydraulic coupling and change speed gear, comprising a driving rotor, a driven rotor, and a stator, one of the rotors and the stator having vanes, the driving rotor and the driven rotor forming together a vane pump device and one of the said rotors and the stator forming together a second vane pump device, one of said rotors containing lining rings forming abutments for the other rotor and the stator, respectively and conduits connecting said pumps.

8. A hydraulic coupling and change speed gear, comprising a driving rotor, a driven rotor, and a stator, one of the rotors and the stator having vanes, the driving rotor and the driven rotor forming together a vane pump device and one of the said rotors and the stator forming together a second vane pump device, conduits connecting said pump devices, and one of said rotors containing lining rings provided with abutments, said lining rings having in their working faces longitudinal channels substantially throughout the length of the abutment inclines, said channels communicating with the pump connecting conduits.

In testimony whereof I have signed my name.

SVEN GUSTAF WINGQUIST.